United States Patent Office 2,918,484
Patented Dec. 22, 1959

2,918,484

PRODUCTION OF NEUTRAL SALTS OF ALUMINUM WITH WATER-SOLUBLE ORGANIC ACIDS

Werner Huehn, Ludwigshafen (Rhine), Germany

No Drawing. Application March 1, 1951
Serial No. 213,474

Claims priority, application Germany March 3, 1950

8 Claims. (Cl. 260—448)

This invention relates to a new and useful process for the production of aluminum triformate or other neutral salts of aluminum with water-soluble organic acids in a practically pure form.

The production of almuinum triformate or neutral aluminum salts of other organic acids offers considerable difficulties if it is desired to obtain products with the highest possible content of $Al_2O_3$.

I have now found that practically pure aluminum triformate or neutral salts of aluminum with other water-soluble organic acids can be obtained in a very advantageous manner by reacting in aqueous solution an inorganic aluminum salt at temperatures below 50° C., preferably at temperatures not substantially exceeding 40° C., with hydroxides or carbonates of the alkalies (including ammonium) and dissolving the resulting water-containing aluminum hydroxide, after freeing it from the mother liquor, in the desired carboxylic acid, the neutral aluminum salt formed being allowed to crystallise out after concentration or the solution being directly evaporated to dryness, preferably in an atomising dryer.

For the dissolution of the initially formed aluminum hydroxide there may be employed formic acid, acetic acid, propionic acid, α-oxypropionic acid, butyric acid, hydroxy acetic acid; they may be used either in the anhydrous form or in aqueous solution. It has been found especially advantageous, in the case of using as initial materials aluminum salts of inorganic acids which do not contain $SO_4''$-ions, to add small amounts of substances which yield $SO_4''$-ions, for example to add a little quantity of sodium sulfate, ammonium sulfate or free sulfuric acid to solutions of aluminum chloride or nitrate. The substances yielding $SO_4''$-ions may also be added to the precipitant, for example to the soda.

Working in the said manner has, in particular, the advantage that waste liquors containing aluminum chloride or sulfate or both, as for example waste liquors from Friedel-Crafts reactions, may be utilised in a very advantageous manner.

A further advantage resides in the fact that salts of aluminum with water-soluble organic acids may be obtained, in which the percentage of $Al_2O_3$ is extraordinarily high, and in some cases comes up to the theoretical or nearly to the theoretical percentage of $Al_2O_3$. There may thus be obtained an aluminum triformate containing more than 28 percent of $Al_2O_3$ or even more than 30 percent of $Al_2O_3$, an aluminum triacetate containing more than 23 to 24 percent of $Al_2O_3$, an aluminum tripropionate containing more than 19 percent of $Al_2O_3$, an aluminum tributyrate containing more than 16 percent of $Al_2O_3$ and an aluminum tri-α-oxypropionate containing more than 16 percent of $Al_2O_3$.

The neutral aluminum salts obtained may be used with advantage as textile assistants.

The following examples will further illustrate this invention but the invention is not restricted to these examples. The parts are by weight.

Example 1

118.5 parts of calcined soda are added while stirring at a temperature of about 40° C. to 412 parts of an about 20% solution of aluminum chloride containing a small amount of aluminum sulfate. The resulting gelatinous aluminum hydroxide is freed from mother liquor on the filter press and carefully washed with cold water.

The aluminum hydroxide is then directly added to 100 parts of an 85% aqueous solution of formic acid, in which it dissolves smoothly; if necessary the solution may be freed from small amounts of impurities by filtration. The solution contains about 22% of aluminum triformate and can readily be converted into the solid form by atomising drying at not too high a temperature. It has a content of 31.4% of $Al_2O_3$ and dissolves readily in warm water to give a clear solution which is stable to boiling.

If desired, a crystalline, water-containing product of the formula $Al(HCOO)_3.5H_2O$ may be obtained from the aluminum triformate solution by concentration and allowing to crystallise out.

Example 2

111 parts of glacial acetic acid are added while stirring to the aluminum hydroxide obtained as described in the first paragraph of Example 1, the resulting solution being filtered if necessary to free it from small amounts of impurities. The dissolved aluminum triacetate is converted into the solid form by atomising drying at a temperature below 100° C. A similar procedure is employed when using, instead of glacial acetic acid, propionic acid, butyric acid, hydroxyacetic acid.

Example 3

124 parts of calcined soda are added to 329 parts of an about 25 percent solution of aluminum chloride containing 3 percent of sulfuric acid at a temperature of about 40° C. while stirring. The resulting gelatinous aluminum hydroxide which still contains a small quantity of sulfuric acid in a combined condtion, is freed from the mother liquor on the filter press and carefully washed with cold water.

The aluminum hydroxide is then directly added to 100 parts of a 85 percent aqueous solution of formic acid, in which it dissolves easily. The $SO_4''$-ions still present in the solution are then removed by precipitation with the calculated quantity of calcium hydroxide or barium hydroxide or barium carbonate and filtration. The solution is then further treated as described in Example 1. A pure aluminum triformate is obtained which is free from sulfuric acid compounds.

What I claim is:

1. The process for the production of aluminum triformate which consists in reacting in aqueous solution an inorganic aluminum salt with a compound selected from the group comprising the hydroxides and carbonates of alkali metals and ammonium at temperatures below 50° C., freeing the resulting water-containing aluminum hydroxide from mother liquor, dissolving it in formic acid and then isolating the aluminum salt formed.

2. The process for the production of aluminum triacetate which consists in reacting in aqueous solution an inorganic aluminum salt with a compound selected from the group comprising the hydroxides and carbonates of alkali metals and ammonium, at temperatures below 50° C., freeing the resulting water-containing aluminum hydroxide from mother liquor, dissolving it in acetic acid and then isolating the alumnium triacetate formed.

3. The process for the production of aluminum tripropionate which consists in reacting in aqueous solution an inorganic aluminum salt with a compound selected from the group comprising the hydroxides and carbonates of alkali metals and ammonium, at temperatures below 50° C., freeing the resulting water-containing aluminum hydroxide from mother liquor, dissolving it in propionic acid and then isolating the aluminum tripropionate formed.

4. The process for the producton of aluminum tributyrate which consists in reacting in aqueous solution an inorganic aluminum salt with a compound selected from the group comprising the hydroxides and carbonates of alkali metals and ammonium, at temperatures below 50° C., freeing the resulting water-containing aluminum hydroxide from mother liquor, dissolving it in butyric acid and then isolating the aluminum tributyrate.

5. The process for the production of neutral salts of aluminum with water-soluble low molecular aliphatic monocarboxylic acids which consists in reacting in aqueous solution an inorganic aluminum salt with a compound selected from the group consisting of the hydroxides and carbonates of alkali metals and ammonium at temperatures below 50° C., freeing the resulting water-containing aluminum hydroxide from mother liquor, dissolving it in the carboxylic acid, the aluminum salt of which is desired, and then isolating the aluminum salt formed.

6. The process for the production of neutral salts of aluminum with water-soluble low molecular aliphatic monocarboxylic acids which consists in reacting in aqueous solution an inorganic aluminum salt with a compound selected from the group consisting of the hydroxides and carbonates of alkali metals and ammonium at temperatures below 50° C., freeing the resulting water-containing aluminum hydroxide from mother liquor, dissolving it in the carboxylic acid, the aluminum salt of which is desired, and then isolating the aluminum salt formed by evaporation in vacuo.

7. The process for the production of neutral salts of aluminum with water-soluble low molecular aliphatic monocarboxylic acids which consists in reacting in aqueous solution an inorganic aluminum salt with a compound selected from the group consisting of the hydroxides and carbonates of alkali metals and ammonium at temperatures below 50° C., freeing the resulting water-containing aluminum hydroxide from mother liquor, dissolving it and then isolating the aluminum salt formed by atomising drying.

8. The process for the production of neutral salts of aluminum with water-soluble low molecular aliphatic monocarboxylic acids which consists in reacting in aqueous solution an inorganic aluminum salt with a compound selected from the group consisting of the hydroxides and carbonates of alkali metals and ammonium at temperatures below 50° C., freeing the resulting water-containing aluminum hydroxide from mother liquor, dissolving it in the carboxylic acid, the aluminum salt of which is desired, and then isolating the aluminum salt formed by crystallization.

References Cited in the file of this patent

UNITED STATES PATENTS

| 2,289,286 | Mazabraud | July 7, 1942 |

FOREIGN PATENTS

| 16,169 1910 | Great Britain | Nov. 10, 1910 |
| 452,065 | Great Britain | Aug. 17, 1936 |

OTHER REFERENCES

Hennig Chemiker-Zeitung, vol. 61, pp. 925–927, November 1937.